United States Patent Office 3,015,635
Patented Jan. 2, 1962

3,015,635
COMPOSITIONS CONTAINING EPOXY ESTERS
AND BITUMINOUS MATERIALS
Theodore F. Bradley, Orinda, and Harry J. Sommer, Lafayette, Calif., assignors to Shell Oil Company, a corporation of Delaware
No Drawing. Filed May 21, 1957, Ser. No. 660,455
13 Claims. (Cl. 260—18)

This invention relates to new compositions of matter which are particularly suited for use as coating compositions. More particularly, the invention relates to new compositions containing bituminous materials which are especially suited for use as surfacing compositions for concrete, asphalt, wood and steel.

Specifically, the invention provides new and particularly useful compositions comprising a mixture of a bituminous material, preferably asphalt, and an ester possessing more than one

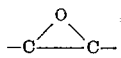

group and at least 8 carbon atoms, and preferably a polyglycidyl ester of a polymerized unsaturated fatty acid. The invention further provides a method for using these compositions as coatings, for concrete, asphalt, wood and steel surfaces.

There is a growing need for a cheap surface coating composition that can be applied to concrete and asphalt road or storage areas to help reduce the destruction of the surface due to heat, wear, rain, deicing salts and cold weather. In the case of asphalt surfaces, there is also a need for coatings which would improve resistance to solvents and other chemicals. This is particularly urgent in the case of asphalt runways for jet aircraft as the conventional jet fuels readily attack asphalt surfaces. Further, worn concrete and worn asphalt road surfaces and exposed metal in bridges, etc., tend to cause skidding when wet and there is a great need for a non-skid coating that will adhere to these surfaces.

Various coatings have been suggested for the above purposes, but the compositions suggested heretofore have not proved very satisfactory. In most cases, the coatings fail to have the necessary adhesion to the concrete, asphalt and metal surfaces, particularly if they are the least oily or dirty. In other cases, the coatings fail to stand up under inclement weather conditions. In still other cases, the coatings fail to have the necessary resistance to heat or solvents or fail to have good wear and non-skid properties. In still other cases, the coatings are too expensive or too difficult to apply.

It is an object of the invention, therefore, to provide new compositions which are suitable for use as coating compositions. It is a further object to provide new compositions which when cured have excellent adhesion to concrete, asphalt, wood and metal surfaces. It is a further object to provide new compositions which form coatings for concrete, asphalt, wood and metal having excellent resistance to heat, wear, rain and cold weather. It is still a further object to provide new surfacing compositions which have good resistance to solvents and deicing salts. It is a further object to provide new surfacing compositions which have excellent skid resistance. It is a further object to provide new coatings which are relatively inexpensive and can be easily applied to new and old surfaces. Other objects and advantages of the invention will be apparent from the following detailed description thereof.

It has now been discovered that these and other objects may be accomplished by the compositions of the invention comprising a mixture of a bituminous material, preferably asphalt, and an ester possessing more than one

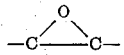

group and at least 8 carbon atoms, and preferably a polyglycidyl ester of a polymerized unsaturated fatty acid. It has been found that these compositions can be easily applied to all types of surfaces, and particularly to concrete, asphalt, wood or metal surfaces, and can be cured in the presence of coupling agents to form flexible tough coatings. The coatings have been found to have good adhesion to these surfaces and stand up well after long periods of use even if the surfaces were oily or dirty before application. The coatings have excellent heat resistance and do not soften, melt or run when exposed to high temperature. The coatings also show good resistance to outdoor weather conditions as well as to solvents, deicing salts, acids and various types of jet fuels. When abrasive aggregates such as sand, corundum, etc., are added to the coatings, the compositions have excellent resistance to skidding. The coatings are particularly attractive for use on highways and runways as they can be easily applied to large areas and set up quickly without the use of any special curing conditions. As noted hereinafter, these compositions have been found to be useful not only for treating roads and runways, but are equally valuable for coating of dock areas, warehouse floors, sidewalks, tennis courts, ship decks such as aircraft carrier decks and the like where wear and weather-resistant and heat-resistant properties are desired.

It was quite unexpected that the above-noted mixtures would be useful for these applications because bituminous materials, such as paving grade asphalts, had been found heretofore to be incompatible with most epoxy resins. It has been found, for example, that straight run asphalt is incompatible with commercial glycidyl ethers, such as Epon 828. The epoxy esters, on the other hand, have an unexpectedly high degree of compatibility with the bituminous materials, including the straight run asphalt, and in addition, their mixture with the bituminous materials form coatings having properties not possessed by either coatings formed from bituminous materials or epoxy esters themselves. It was unexpected, for example, to find that the coatings possessed excellent heat resistance even though they contained large amounts of the fusible bituminous material.

The bituminous materials used in the compositions of the present invention include substances containing bitumens or pyrobitumens, pyrogenous distillates and tars, pyrogenous waxes and pyrogenous residues (pitches and pyrogenous asphalts). They are preferably composed mainly of hydrocarbons although they may contain amounts of sulfur, nitrogen and oxygen-containing materials. They also are preferably fusible and largely soluble in carbon disulfide. Examples of such bituminous materials may be found in Abraham's "Asphalts and Allied Substances," vol. I, page 57, 5th edition.

An especially preferred group of bituminous materials to be used in the compositions of the invention include the asphalts. These asphalts may be straight run, blown, cracked aromatic and catalytically or non-catalytically polymerized asphalts. All such asphalts are useful regardless of their original penetrations or softening points.

Especially preferred are the straight run asphalts used for paving, such as those having penetrations between 40 and 300 and softening points within the range from about 145° F. to about 95° F. Blown asphalts suitable for use in roofing are also preferred. Blown asphalts are normally produced in the presence or absence of catalysts by blowing asphalts or fluxes at elevated temperatures with an oxygen-containing gas such as air. Typical blown asphalt may have softening point range of between about 300° F. and about 120° F. and a penetration within the range from about 100 to about 0.

Aromatic asphalts, such as those comprising the bottoms products from the distillation of catalytically cracked gas oil, are also preferred.

Other preferred materials include high boiling extracts of petroleum, such as those obtained by extracting petroleum with solvents having preferential selectivity for aromatics and naphthenes. To obtain such extracts various non-reactive, highly polar, aromatically preferential solvents are used such as liquid $SO_2$, phenol, cresylic acid, furfural, beta,beta-dichloroethyl ether, nitrobenzene and the like. The use of the so-called double solvent process employing mutually immiscible solvents like cresylic acid and propane also gives suitable extracts. Especially preferred are the Edeleanu extracts of petroleum distillates, i.e., extracts obtained by use of liquid $SO_2$ or liquid $SO_2$ in combination with benzene, etc. The extracts are high-boiling materials which range in general from viscous liquids to tar-like materials at ordinary temperatures. Extracts boiling above 300° C. at 760 mm. Hg are preferred.

Also preferred are the products derived from coal such as coal tars, refined coal tars and coal tar pitches, and preferably those having a softening point below 190° F. and a solubility in carbon disulfide of at least 50%. The expression "tar" as used herein refers to products obtained in connection with the destructive distillation of coal. When part of the volatile material is removed, the residue is called "refined coal tar." When additional volatile material is removed, the residue is termed "coal tar pitch." Residuals having a fusing point below about 70° F. are referred to herein as refined coal tars while those having fusing points of 70° F. or above are coal tar pitches. As used herein, "softening point" or "fusing point" refers to values obtained by the cube method as described in vol. II, Abraham, "Asphalts and Allied Substances," 5th edition. The coal products should possess at least 50% and preferably 75% solubility in carbon disulfide. The coal tar, refined coal tar and coal tar pitch may be acidic, basic or neutral, depending on whether the acid and/or bases have been removed. These coal products may be obtained from various types of bituminous coals, such as, for example, cannel, bog-peat, carbonite, and the like, and may be derived from various processes, such as from gas works, coke ovens, blast furnaces, gas producers and various low temperature processes. Description of examples of various coal tars, refined coal tars and coal tar pitches may be found on pages 384 to 405 of Abraham, "Asphalts and Allied Substances."

Particularly preferred coal derivatives to be used in preparing the compositions of the present invention include the residuals resulting from distillation of coal tar, and preferably refined coal tars having a fusing point of below 70° F. and a solubility in carbon disulfide of at least 75% with a specific gravity of 1.10 to 1.50, and low melting coal tar pitches having a fusing point below 120° F. and a solubility in carbon disulfide of at least 75%.

The epoxy esters to be combined with the above-described bituminous materials comprise those organic and inorganic acid esters which possess more than one vic-epoxy group, i.e. a

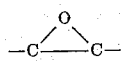

group, and at least 8 carbon atoms, and preferably 12 to 70 carbon atoms. The esters preferably contain two or more ester groups and especially 2 to 6

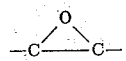

groups. The vic-epoxy groups may be in the acid and/or alcohol portion of the ester molecule and may be terminal or internal groups, i.e. a

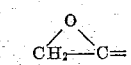

group or a

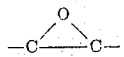

group. Examples of these epoxy materials comprise the epoxidized polyethylenically unsaturated polycarboxylic acid esters, such as, for example, dimethyl 8,9,12,13-diepoxyeicosanedioate, dibutyl-7,8,11,12-diepoxyoctadecanedioate, dioctyl 10,11-diethyl-8,9,12,13-diepoxyeicosanedioate, dihexyl 6,7,10,11-diepoxyhexadecanedioate, didecyl 8-epoxyethyl-10,11-epoxyoctadecenedioate, dibutyl 3-butyl-3,4,5,6-diepoxycyclohexane-1,2-dicarboxylate, dibenzyl 1,2,4,5-diepoxycylohexane-1,2 - dicarboxylate, diethyl - 3-acetoxy-1,2,4,5-diepoxycyclohexane-1,2-dicarboxylate and diethyl 5,6,10,11-octadecylsuccinate. Especially preferred are the epoxidized dialkyl esters of polyethylenically unsaturated aliphatic and cycloaliphatic dicarboxylic acids, and especially those containing from 8 to 30 carbon atoms.

Another group of epoxy materials include the esters of epoxy alcohols and epoxy carboxylic acids, such as, for example, tri(2,3 - epoxypropyl)epoxyaconitate, di(2,3-epoxypropyl) 4,5-epoxycyclohexane-1,2-carboxylate, tri-(2,3-epoxypropyl)epoxyitaconate, di(2-methyl-2,3-epoxypropyl) 4,5-epoxycyclohexane-1,2-dicarboxylate, di(3,4-epoxybutyl) 3,6-dimethyl-4,5-epoxycylohexane-1,2-dicarboxylate, di(2,3-epoxypropyl) 2,3-epoxy-octadecylsuccinate, di(5,6-epoxyhexyl) 3,4,5,6-diepoxycyclohexane-1,2-dicarboxylate, di(3,4-epoxyhexyl) 2,3-epoxyhexadecylsuccinate, 2,3-epoxypropyl allyl 4,5-diepoxycyclohexane-1,2-dicarboxylate, di(2,3-epoxypropyl) - 3 - chloro-4,5-epoxycyclohexane - 1,2 - dicarboxylate, di(3,4 - epoxyhexyl) 8,9,12,13-diepoxyeicosanedioate and di(3,4-epoxypentyl) 7,8,11,12-diepoxyoctadecanedioate.

Another group comprises the esters of polyhydric alcohols and epoxy-substituted monocarboxylic acids, such as, for example, glycerol tri(8,9-epoxydodecanoate), glycerol 10,11-epoxyoctadecaneoate, epoxidized triglycerides, such as epoxidized soybean oil, sardine oil, cottonseed oil and the like.

Another group and especially preferred group are the esters of epoxy-substituted alcohols and polycarboxylic acids, such as diglycidyl adipate, diglycidyl succinate, diglycidyl dodecanedioate, diglycidyl octadecanedioate, diglycidyl 1,20-eicosanedioate, diglycidyl 1,18-eicosanedioate, and the glycidyl esters of polymerized unsaturated fatty acids, such as the dimerized and trimerized fatty acids obtained by heat polymerization of fatty acids under known conditions, such as dimerized and trimerized linoleic acid, linolenic acid, eleostearic acids and licannic acids.

Particularly preferred because of the rapid cure obtained therewith and the particularly superior properties of the resulting products are those wherein the epoxy groups are in terminal positions, i.e. have the structure

such as the above-noted glycidyl esters. In addition, the especially preferred esters to be because of the high degree of compatibility obtained therewith are the glycidyl esters of polybasic acids containing from 20 to 70 carbon atoms and especially the dimerized and trimerized fatty acids. These acids are preferably obtained by heating the methyl esters of the acids by the method described in "Industrial and Engineering Chemistry," vol. 38, page 1139 (1946). The structures of the products so obtained are believed to be those given in "Industrial and Engineering Chemistry," vol. 33, page 89 (1941).

The above epoxy esters may be obtained by epoxidizing the corresponding unsaturated esters by the method described in U.S. 2,761,870 or by reacting the acids with chlorohydrins as described in U.S. 2,772,296.

The glycidyl esters of the polycarboxylic acids are preferably obtained by reacting a potassium or sodium salt of the acid with epichlorohydrin in the presence of a tertiary amine alkaline material as described in U.S. 2,448,602. Illustrative examples of the preparation of some of these esters are given below.

DIGLYCIDYL ESTER OF DIMERIZED LINOLEIC ACID 90 grams of dimerized linoleic acid was dissolved in benzene and 16.8 parts KOH (19.8 parts of 95% KOH in 15 parts water) stirred into the mixture. The benzene was then distilled off to remove the water. To the dry salt was added 368 parts of epichlorohydrin. The mixture was stirred and heated to 100° C. for ½ hour. The temperature was then maintained at 100° C. to 105° C. for one hour. The salt formed in the reaction (KCl) was filtered off and the excess epichlorohydrin topped off at 110° C. at 1–2 mm. The resulting product was a fluid liquid having an epoxy value of 0.23 eq./100 g., OH value of 0.04 eq./100 g., ester value 0.293.

TRIGLYCIDYL ESTER OF TRIMERIZED LINOLEIC ACID 96 parts of trimer acid (trimerized linoleic acid) was dissolved in 300 parts of benzene and 16.8 parts of KOH (19.8 parts of 85% KOH in 15 parts of water) stirred into the mixture. After stirring for one hour, benzene and water were distilled off leaving solid potassium salt. The salt was broken up and 368 parts of epichlorohydrin added. 1 part of benzene trimethyl ammonium chloride was added as a catalyst. The mixture was heated for 1 hour at 95° C. The mixture was then filtered and the salt washed with benzene. The filtrate was then distilled to remove benzene and excess epichlorohydrin. The resulting product was a liquid having an epoxy value of 0.233 eq./100 g.

GLYCIDYL ESTER OF DIMERIZED ROSIN ACIDS 100 parts of dimerized rosin acids (softening point 145–158° C.) was dissolved in ethyl alcohol and benzene. 14.5 parts of KOH was added to the mixture. After stirring for one hour, benzene and water were distilled off leaving solid potassium salt. The salt was mixed with 230 parts of epichlorohydrin and 1 part of benzyl trimethyl ammonium chloride. The mixture was maintained at 100–105° C. for about 1.5 hours. After cooling, the salt was filtered off and the filtrate distilled at 110° C. at 2 mm. to yield a thick liquid identified as the glycidyl ester of the dimerized rosin acids having an epoxy value of 0.221 eq./100 g.

GLYCIDYL ESTER OF MALEIC ANHYDRIDE-ROSIN ADDUCT 57 parts of an adduct of methyl abietate and maleic anhydride were combined with 29 parts of 85% KOH in 150 parts of water and refluxed 2 hours. The mixture was neutralized to pH of 8–9 and then water was distilled off. 500 parts of benzene were added and distilled to remove last trace of water. 4 mols of epichlorohydrin were then added and the mixture heated to reflux for one hour. The salt was removed by filtration and the mixture distilled to remove excess epichlorohydrin. The resulting ester had an epoxy value of 0.205 eq./100 g.

DIGLYCIDYL ESTER OF 1,20-EICOSANEDIOIC ACID 100 parts of 1,20-eicosanedioic acid was dissolved in 300 parts of benzene and 85% KOH added to the mixture. After stirring for one hour, benzene and water were distilled off leaving solid potassium salt. The salt was broken up and epichlorohydrin added. 1 part of benzene trimethyl ammonium chloride was added as a catalyst. The mixture was heated for 1 hour at reflux. The mixture was then filtered and the excess epichlorohydrin distilled off. The resulting ester had an epoxy value of 0.405 eq./100 g.

The compositions of the invention may be prepared by any suitable method. If one or both of the bituminous material and the epoxy ester are liquid, the compositions may be prepared by simply mixing the two components together with or without the application of heat. If one or more of the components are vrey thick liquids or solids, it is generally preferred to heat them before or during the mixing. Various solvents or diluents which will evaporate before or during cure may be added to assist in the preparation of the mixture, but the addition of these materials is not generally desirable as it usually lengthens the time of cure of the finished product. Suitable solvents include hydrocarbon, such as xylene, benzene, petroleum distillates and the like. It is also convenient in some cases where employing solid component or components to employ some liquid polyepoxide, such as normally liquid glycidyl polyethers of polyhydric alcohols, as the diluent.

The ratio of the bituminous material and the epoxy ester in the composition may vary depending upon the properties desired in the resultnig product. Compositions having the above-described unexpected properties, such as excellent adhesion and improved water resistance and solvent resistance, are obtained when the epoxy ester makes up at least 5% and preferably 15% to 85% of the mixture of bituminous material and epoxy ester.

Other materials may be added to the compositions in addition to the above-noted ingredients. As the presence of the epoxy esters improves compatibility with the bituminous materials, it is possible to add other types of epoxy resins which by themselves have little or no compatibility with the bituminous materials, such as glycidyl ethers and especially glycidyl ethers of polyhydric phenols as described in U.S. 2,633,458. The addition of these glycidyl ethers make the product stronger and harder as shown in the examples at the end of the specification.

An especially preferred type of composition covered by the present invention include those wherein small inert solid particles are added to the compositions to give the resulting coating improved skid resistance. The particles should be rather finely divided and preferably have a mesh size varying from about 4 to 300. Preferred materials include sand, finely divided rocks, finely divided shells, crushed quartz, aluminum oxide, finely divided resinous particles and the like. Particularly preferred are the mineral and especially the siliceous materials, such as, for example, sand and ground rock. Mixtures of various types of particles may also be used.

The amount of the inert particles to be added to the composition in forming the non-skid coatings should be at least 50% by weight of the total mixture of bituminous material and epoxy ester and should preferably be between 70% and 500% by weight of such mixture.

The inert particles may be added to the composition before it is applied to the desired surface, or the bituminous material epoxy ester mixture may be first applied to the surface and then the inert particles placed in the coating so that they become imbedded in the mixture, or both systems may be used. In coating highway surfaces, the bituminous material epoxy ester mixture are preferably applied directly to the road surface and then the inert particles, such as sand, are sprinkled onto the coating before it is cured.

The composition of the invention is cured by the action of a curing agent. For this purpose, epoxy curing agents, which may be acidic, neutral or alkaline, are added. Examples of the curing agents include, among others, alkalies like sodium or potassium hydroxides; alkali phenoxides like sodium phenoxide; carboxylic acids or anhydrides, such as formic acid, oxalic acid or phthalic anhydride; dimer or trimer acids derived from unsaturated fatty acids, 1,20-eicosanedioic acid, and the like. Friedel-Crafts metal halides like aluminum chloride, zinc chloride, ferric chloride; salts, such as zinc fluoborate, magnesium perchlorate and zinc fluosilicate; phosphoric acid and partial esters thereof including n-butyl orthophosphate, diethyl ortho-phosphate and hexaethyltetraphosphate; amino compounds, such as, for example, diethylene triamine, triethylene tetramine, dicyandiamide, melamine, pyridine, cyclohexylamine, benzyldimethylamine, benzylamine, diethylaniline, triethanolamine, piperidine, tetramethylpiperazine, N,N-dibutyl-1,3-propane diamine, N,N-diethyl-1,3-propane diamine, 1,2-diamino-2-methylpropane, 2,3-diamino-2-methylbutane, 2,4-diamino-2-methylpentane, 2,4-diamino-2,6-dimethyloctane, dibutylamine, dioctylamine, dinonylamine, distearylamine, diallylamine, dicyclohexylamine, methylethylamine, ethylcyclohexylamine, o-tolylnaphthylamine, pyrrolidine, 2-methyl-pyrrolidine, tetrahydropyridine, 2-methylpiperidine, 2,6-dimethyl-piperidine, diaminopyridine, tetramethylpentane, meta-phenylene diamine, and the like, and soluble adducts of amines and polyepoxides and their salts, such as described in U.S. 2,651,589 and U.S. 2,640,037. Also included are the amino-amides obtained by reacting poly-basic acids with polyamides.

Preferred curing agents are polycarboxylic acid anhydrides, the primary and secondary aliphatic, cycloaliphatic and aromatic amines and adducts of the amines and polyepoxides.

The amount of the curing agent employed will vary depending upon the type of agent selected. In general, the amount of the curing agent will vary from about 0.5% to 200% by weight of the epoxy ester. The tertiary amines and BF$_3$ complexes are preferably employed in amounts varying from about 0.5% to 20% and the metal salts are preferably employed in amounts varying from about 1% to 15%. The secondary and primary amines, acids and anhydrides are preferably employed in at least stoichiometric amounts, i.e., sufficient amount to furnish one amine hydrogen or one carboxyl group or anhydride group for every epoxy group, and more preferably stoichiometric ratios varying from 1:1 to 1:1.5.

The curing agents may be added to the compositions at any time. It is generally preferred to prepare the bituminous material-epoxy ester compositions and the curing agents as separate packages and then mix the two just before application to the desired surface. The curing agent may also be sprayed or otherwise applied to the coating of the bituminous material-epoxy ester mixture after it has been applied to the desired surface, but this procedure is less preferred. It is possible also to add the curing agent to the bituminous material combining with the epoxy ester.

The compositions of the invention may be applied to any surface but are particularly suitable for use as surfacing compositions, concrete, asphalt, wood and steel. The concrete may be of any of the usual types such as may be prepared from hydraulic cements, such as Portland cement, and other types as aluminous and oxy salt type cements. The asphalt surfaces may be those prepared from any paving grade asphalts, such as straight run asphalts or further refined or modified asphalts. These materials may be in the form of roads, runways, dock areas, sidewalks, tennis courts, etc., as the coating may be applied to very small areas as well as large areas. The compositions may be applied in very thin coatings or in very thick coatings. Preferred coatings range about 1/16 inch to about 1/4 inch.

The application to the surfaces may be accomplished by any suitable method. If the material is thick or contains large amounts of inert particles as in the case of the non-skid coatings, the compositions may best be applied by the use of screeds, trowels, shovels, brooms and the like. If the composition is of a more fluid nature, it may best be applied by brushing, spraying or rolling.

The following examples illustrate the operation of the present invention.

*Example I*

This example illustrates the preparation and properties of a composition containing a straight run paving grade asphalt and triglycidyl ester of trimer acid prepared as shown above.

50 parts by weight of straight run asphalt having a penetration of 90 and a softening point of 120° F. was mixed with 50 parts by weight of triglycidyl ester of trimerized linoleic acid as prepared above and 10 parts of xylene. 3.4 parts of diethylene triamine was then added to the mixture.

The mixture prepared above was then spread on tin panels and glass panels to a thickness of 1 mil and allowed to set at room temperature (about 20° C.). The resulting films had good adhesion to the metal and glass and good resistance to solvents and jet fuels and remained unchanged in standard rain and sunshine weatherometer tests after at least 35 cycles.

A portion of the mixture prepared as above was also applied to freshly cleaned concrete panels. Crushed quartz was spread on the top of the coating. The coatings set up to form tough solvent-resistant coatings. The coatings adhered well to the concrete and had good resistance to change in weather as shown by tests wherein the coated blocks were subjected to rapid changes in temperature and placed in contact with water.

*Example II*

60 parts by weight of straight run asphalt as described in Example I was mixed with 40 parts by weight of triglycidyl ester of trimer acid as in Example I and to this mixture was added 4 parts of diethylene triamine. This mixture was spread on an asphalt pavement as a coating 1/16 inch thick and allowed to set hard at atmospheric temperature. Sand was sprinkled on the top before the final cure. The resulting coating was tough, solvent-resistant coating having good resistance to skidding.

To test resistance to solvents, jet fuel was sprayed twice a day on the coating. No change was noted in the condition of the pavement even after 6 weeks. During a similar period of use and treatment, the unmodified straight run asphalt applied to an asphalt pavement softened and commenced to disintegrate.

Asphalt panels coated with the above composition also remained undamaged in standard rain and sunshine weatherometer tested after at least 35 cycles. Unmodified asphalt panels showed clear signs of disintegration or deterioration after 2 cycles under the same conditions.

*Example III*

50 parts of a catalytically cracked gas oil (bottoms obtained from the distillation of a catalytically cracked gas oil having zero penetration at 77° F. and a softening point of 162° F.) was mixed with 50 parts of the triglycidyl ester of trimer acid. 4 parts of diethylene triamine was added to the mixture and the composition spread on concrete and asphalt panels as a coating 1/16 inch thick and allowed to set hard at about 60° C. The resulting compositions were tough solvent-resistant coatings having good adhesion to the substrata.

When the above procedure was repeated and sand was spread on the top before final cure, the resulting coatings also possessed excellent skid resistance.

Related results are also obtained by replacing the triglycidyl ester of trimer acid in the above process with equal amounts of each of the following: diglycidyl ester of 1,20-eicosanedioic acid, diglycidyl ester of 1,18-octadecanedioic acid, and diglycidyl esters of dimerized rosin acids.

*Example IV*

This example illustrates the preparation and properties of a composition containing coal tar pitch and triglycidyl ester of trimer acid.

50 parts of a coal tar pitch having a melting point of

75–80° F. (R. and B.), a $CS_2$ insolubility of 8–14% weight and a sp. g. 25/25° C. of 1.20–1.26 was combined with 50 parts of triglycidyl ester of trimer acid and 2.5 parts of diethylene triamine. This mixture was applied to glass and steel panels and cured for 2 hours at 100° C. to form tough coatings which had good adhesion and good resistance to solvents.

This mixture was also applied over smooth concrete at a rate of 1 pound per square yard and allowed to set at atmospheric temperature. Before hardening was complete, 30 mesh aluminum oxide was strewn over the surface. When curing was complete, the excess aluminum oxide was removed leaving a rough textured, though even, surface on the concrete. The coating had good adhesion to the concrete and had good resistance to wear and skidding.

Related results are obtained by replacing the coal tar pitch in the above process with equal amounts of each of the following: refined coal tar having a spec. viscosity (Engler) of 50 at 40° C. and a solubility of at least 70% in carbon disulfide, lignite tar and coal tar.

*Example V*

This example illustrates the preparation and properties of a composition containing a straight run paving grade asphalt and a diglycidyl ester of dimer acid.

40 parts by weight of straight run asphalt as described in Example I was combined with 60 parts by weight of diglycidyl ester of dimerized linoleic acid prepared as described above and 4 parts of diethylene triamine added thereto.

The mixture prepared above was spread on asphalt pavement as a coating 1/16 inch thick and allowed to set hard at 60° C. Sand was sprinkled on the top before the final cure. The resulting coating was tough and had good resistance to solvents and to skidding when wet.

Related results are obtained by replacing the straight run paving grade asphalt with equal amount of blown asphalt roofing grade and the bottoms obtained from distillation of catalytically cracked gas oil.

*Example VI*

This example illustrates the preparation and properties of a composition containing a straight run paving grade asphalt and a mixture of triglycidyl ester of trimer acid and a glycidyl ether of 2,2-bis(4-hydroxyphenyl)propane having an epoxy value of .50 eq./100 g. (Epon 828).

25 parts of straight run asphalt as described in Example I, 75 parts of a mixture made up of equal parts triglycidyl ester of trimer acid and the above-noted glycidyl diether of 2,2-bis(4-hydroxyphenyl)propane were mixed together. 6 parts of diethylene triamine were added thereto. The mixture was spread out on steel panels and tin panels to a thickness of about 1 mil and allowed to set at room temperature. The resulting films were hard and had good adhesion to the metal and good resistance to solvents.

The same mixture was applied to asphalt panels to a thickness of about 1/4 inch and crushed quartz was spread on the top of the coating. The coating set up to form a hard tough solvent resistant coating which had good adhesion and good skid resistance particularly when wet. The coating was harder than without the glycidyl ether.

Related results are obtained by replacing the glycidyl ether with equal amounts of each of the following: glycidyl ether of glycerine, glycidyl ether or resorcinol and diglycidyl ether of ethylene glycol.

*Example VII*

Example VI was repeated with the exception that the mixture of triglycidyl ester and the glycidyl polyether were varied in the following ratios: 30 parts of glycidyl ether, 70 parts of triglycidyl ester; 25 parts of glycidyl ether, 75 parts of triglycidyl ester; 60 parts of glycidyl ether and 40 parts of triglycidyl ester.

*Example VIII*

Examples I to VII are repeated with the exception that the curing agent used is one of the following: ethylene diamine, hexamethylene diamine, tetraethylene pentamine and 1,3-diaminocyclohexane.

*Example IX*

60 parts of dimethyl 8,9,12,13-diepoxyeicosanedioate and 40 parts of the bottoms obtained from the distillation of a catalytically cracked gas oil as defined in claim 3 are combined. A stoichiometric amount of hexahydrophthalic anhydride (based on the diepoxide) and 1% benzyldimethylamine are added and the mixture heated to 150° C. and then quickly applied to concrete and steel panels. Heat was then applied to the coating until it set up to form a tough solvent resistant coating having good adhesion to the panels.

Related results are obtained by replacing the above diepoxide with equal amounts of each of the following: diethyl 7,8,11,12-diepoxyoctadecanedioate, glycerol tri-(8,9-epoxydodecaneoate) and the glycerol tri(10,11-epoxyoctadecaneoate).

*Example X*

25 parts of triglycidyl ester of trimer acid and 75 parts of the bottoms obtained from the distillation of a catalytically cracked gas oil having zero penetration and a softening point of 162° F. are combined and 3 parts of diethylene triamine added thereto. The mixture is spread on concrete panels as a coating about 1/16 inch thick and allowed to set at 60° C. The resulting composition is tough and has good adhesion to the substrata. The composition also has good solvent resistance.

*Example XI*

50 parts of triglycidyl trimer acid is combined with 50 parts of a liquid Edeleanu extract of petroleum vacuum distillate having s.g. of 1.01 (20/4), final boiling point of 217° C. at 1 mm. Hg and viscosity at 100° F. of 62 centistokes. 5 parts of diethylene triamine is added and the mixture spread on asphalt panels and cured at 60° C. The resulting coatings have good adhesion to the panels and have good solvent resistance.

*Example XII*

This example illustrates the difference between the action of the epoxy esters and glycidyl ethers with bituminous materials.

50 parts of glycidyl ether of 2,2-bis(4-hydroxyphenyl) propane (Epon 828) was mixed with 50 parts of paving grade asphalt and 5 parts of diethylene triamine and the mixture spread out on glass panels and heated at 100° C. The resulting coating appeared as a heterogeneous mixture which was weak and was soluble in ketone solvents.

Another coating prepared from 50 parts of triglycidyl ester of trimer acid, 50 parts of the same paving grade asphalt and 5 parts of diethylene triamine, and cured as above, on the other hand, was a tough homogeneous coating which had good resistance to ketone solvents.

The new compositions of the invention may also be used as a replacement for asphalt binders for graded aggregate in preparation of paving mixes. In this case, the composition is mixed with the aggregate and the mixture spread and compressed in conventional manner.

We claim as our invention:

1. A composition consisting essentially of a bituminous material and from 1% to 85% by weight of the combined mixture of an epoxy organic ester possessing more than one vic-epoxy group and at least 8 carbon atoms in the acid portion of the ester molecule.

2. A composition as in claim 1 wherein the epoxy ester is a glycidyl ester of a polymerized unsaturated fatty acid.

3. A composition as in claim 1 wherein the ester is a glycidyl ester of an eicosanedioic acid.

4. A composition as in claim 1 wherein the bituminous material is a straight run asphalt.

5. A composition as in claim 1 wherein the bituminous material is coal tar pitch.

6. A composition as in claim 1 wherein the bituminous material is refined coal tar.

7. A composition as in claim 1 wherein the bituminous material is coal tar.

8. A composition as in claim 1 wherein the bituminous material is a catalytically cracked gas oil.

9. A composition consisting essentially of an asphalt and 1% to 85% by weight of the combined mixture of an aliphatic epoxy organic ester having more than one vic-epoxy group from 8 to 36 carbon atoms in the acid portion of the ester molecule and a plurality of

groups.

10. A composition as in claim 9 wherein the epoxy ester is a glycidyl ester of a cycloaliphatic polycarboxylic acid.

11. A composition as in claim 1 wherein the epoxy ester is a glycidyl ester of trimerized linoleic acid.

12. A composition consisting essentially of a bituminous material of the group consisting of asphalts, high boiling extracts of petroleum, coal tars, refined coal tars and coal tar pitches and 1% to 85% by weight of the combined mixture of an epoxy organic ester having more than one vic-epoxy group and at least 8 carbon atoms in the acid portion of the ester molecule.

13. A composition as in claim 12 wherein the epoxy organic ester is a diglycidyl ester of dimerized linoleic acid.

References Cited in the file of this patent

UNITED STATES PATENTS

| | | |
|---|---|---|
| 2,761,870 | Payne et al. | Sept. 4, 1956 |
| 2,764,497 | Mika et al. | Sept. 25, 1956 |
| 2,765,288 | Whittier et al. | Oct. 2, 1956 |
| 2,783,250 | Payne et al. | Feb. 26, 1957 |
| 2,940,986 | Newey | June 14, 1960 |
| 2,956,034 | Simpson | Oct. 11, 1960 |

OTHER REFERENCES

Charlton: Alloying With Epoxies, Modern Plastics, 32: vol. 1 (1954, p. 155, pp. 155, 160 and 161 relied upon).

Turner: "Point Manufacture," September 1956, pp. 321–326.